United States Patent [19]

Satake

[11] Patent Number: 4,945,296
[45] Date of Patent: Jul. 31, 1990

[54] VARIABLE SPEED CONTROLLABLE INDUCTION MOTOR

[75] Inventor: Toshihiko Satake, Higashihiroshima, Japan

[73] Assignee: Satake Engineering

[21] Appl. No.: 217,966

[22] Filed: Jul. 12, 1988

[30] Foreign Application Priority Data

Jul. 14, 1987 [JP] Japan ................................ 62-176475
Sep. 7, 1987 [JP] Japan ................................ 62-225082

[51] Int. Cl.⁵ ......................................... H02K 27/20
[52] U.S. Cl. ................................... 318/538; 310/112; 310/116; 310/166; 310/197; 318/727
[58] Field of Search ............... 310/166, 211, 212, 112, 310/201, 114, 115, 116, 122, 208, 197, 229, 230, 182, 183, 254, 261, 187, 188, 191, 209; 318/437, 538, 539, 730, 771, 830, 832, 727; 322/32

[56] References Cited

U.S. PATENT DOCUMENTS

| | | | |
|---|---|---|---|
| 1,246,643 | 11/1917 | Neuland | 310/115 |
| 1,708,909 | 4/1929 | Spencer | 310/212 |
| 3,280,400 | 10/1966 | Roe | 310/112 |
| 3,290,574 | 12/1966 | Roe | 310/212 |
| 3,435,315 | 3/1969 | Kordik | 318/832 |
| 4,229,689 | 10/1980 | Nickoladze | 322/32 |
| 4,785,213 | 11/1988 | Satake | 310/116 |

FOREIGN PATENT DOCUMENTS

0086807 8/1974 Japan.
0029005 3/1979 Japan.

Primary Examiner—R. Skudy

[57] ABSTRACT

A variable speed controllable induction motor comprises a single rotor formed in one-piece having different sets of rotor conductive members effective respectively at different speed ranges, that is, at least a set of first conductive members specifically effective for a lower speed range and a set of second conductive members specifically effective for a higher speed ranges; a plurality of stators disposed side by side surrounding and facing respective portions of said rotor; and a phase shifting apparatus for producing phase differences on the respective portions of the rotor conductive members. The motor can achieve an overall wide range speed control due to the combined effects of the characteristics obtained respectively from the different set of the rotor conductive members.

11 Claims, 10 Drawing Sheets

VARIABLE SPEED CONTROLLABLE INDUCTION MOTOR

BACKGROUND OF THE INVENTION:

The present invention relates to a variable speed controllable induction motor by which speed control over a wide range can be easily effected and in which the torque characteristics and efficiency are excellent.

A squirrel-cage rotor type induction motor is widely used as a prime mover as it is simple in its construction, less costly, less susceptible to damage and, moreover, both the power factor and efficiency are good in operation of the motor. However, drawbacks of the squirrel-cage rotor type induction motor are that the starting characteristics thereof are not good, that is, a starting torque is not sufficiently satisfactory despite high current consumption at starting and that it is difficult to effect a wide range speed control with high efficiency.

In a wound rotor type induction motor in which a secondary resistor is inserted externally through brushes and slip-rings in the circuit of rotor windings, a continuous and efficient speed control can be effected comparatively simply by means of controlling the resistance values to thereby change the slip of the motor. However, in the squirrel-cage rotor type induction motor, the structure or configuration thereof does not permit such a method of control and, therefore, the methods generally adopted are as explained hereunder.

As methods of continuous control of speeds, one method is by way of varying a power source frequency and another is by changing a power source voltage. Both of these methods are generally not satisfactory and have drawbacks in that efficiency of the control is low at low speed ranges. Further, the former method requires a high cost frequency convertor which, in the course of converting frequencies, produces high harmonic noise and other electromagnetic waves which, if they flow into the commercial power lines, would cause the occurrence of various harmonic noise problems, causing malfunctioning of computers or other electronic devices, heating of power capacitors, etc.

Further, as a method of continuous control of speeds, it is known to arrange that two induction motor components of the same poles are axially disposed side by side and two stators having primary windings cause, by either mechanical or electrical means, a phase difference between the rotating magnetic fields generated around each of the two rotor cores of a single rotor provided on a rotary axis so that a speed control is effected by varying the phase difference thereby to change the amount of the combined secondary voltage, that is, to change the amount of the secondary current flowing in the conductive members of the rotor.

Also, there has been known a system in which several kinds of poles are provided in stator winding circuits of the motor and a speed control is performed by means of switching the poles during the operation. While this system enables a speed to be controlled step-wise or noncontinuously, it is not possible to perform a stepless and smooth control of the speed by this system.

The applicant of the present application filed a U.S. patent application, U.S. Ser. No. 055,147, on May 28, 1987 now U.S. Pat. Ser. No. 4,785,213. The invention covered therein relates to a variable speed controlled induction motor characterized by the combination of:

a rotor formed in one-piece having a plurality of rotor cores mounted, with a predetermined air space or a non-magnetic core portion being provided therebetween, on a common axis and having a plurality of conductive members interconnected and respectively mounted on the rotor cores;

a plurality of stators having a plurality of stator cores disposed side by side and surroundingly facing the respective rotor cores and having stator windings wound respectively on the stator cores, the stator windings being connected or coupled in series with respect to the power source;

connecting members short-circuiting the conductive members at the air space or non-magnetic core portion disposed between the rotor cores; and phase shifting means for producing phase differences between the voltages induced on the portions of the conductive members which face one of the plurality of stators and the voltages induced on the corresponding portions of the conductive members which face another one of the stators.

That invention provides a variable speed controlled induction motor which, as compared with conventional induction motors, is far superior in starting characteristics and in capability of performing an efficient speed control over a wide range. However, since the disclosure for that invention was silent on the character of materials of conductive members so that, if all of the several sets of rotor conductive members were of materials which have the same electric characteristics of conductivity with respect to one another, there was a possibility for the operational characteristics to be limited depending on the selection of such materials because, if all of the conductive members happened to be of materials either all higher resistivity or all lower resistivity, this would of course significantly affect the operational characteristics of the motor. If the conductive members of the rotor are made of higher resistivity materials, it may be possible to obtain a sufficiently high starting torque but the maximum rotation speed at a rating load tends to be somewhat lower as compared with a normal one having the same rating output. On the other hand, if the conductive members of the rotor are made of lower resistivity materials, torque characteristics during starting of the motor and low speed operation of the motor do not show any marked improvement over the conventional ones.

OBJECTS OF THE INVENTION:

One of the objects of the present invention is to provide a squirrel-cage rotor type induction motor which comprises different sets of conductive members effective respectively at different speed ranges, that is, at least a set of conductive members specifically for a low speed range and a set of conductive members specifically for a high speed range, so that the motor can achieve an overall wide range speed control due to the combined effects of the characteristics obtained respectively from the different sets of conductive members.

Another object of the present invention is to provide a squirrel-cage rotor type induction motor which has excellent starting torque characteristics so that the motor can be started with any given and desired starting torque.

A still further object of the present invention is to provide a squirrel-cage rotor type induction motor having excellent torque characteristics and high efficiency which appear over the entire speed range from the starting point to the maximum rotation speed by the application of a rating current approximately the same as that applied at the maximum rotation speed.

SUMMARY OF THE INVENTION

According to the present invention, there is provided a variable speed controllable induction motor comprising:

a single rotor formed in one-piece having a plurality of rotor cores axially mounted on a common axis with an airspace or a non-magnetic core portion being provided between said rotor cores and having, on said rotor cores, a plurality of sets of rotor conductive members including first group conductive members effective specifically for a low speed range and second group conductive members effective specifically for a high speed range, at least said first group conductive members being short-circuited at said airspace or said non-magnetic core portion by resisting members and each set of said rotor conductive members being respectively connected linearly;

a plurality of stators disposed side by side and surrounding and facing said respective rotor cores; and phase shifting means for producing phase differences between the voltage induced on the portions of said rotor conductive members which face one of said plurality of stators and the voltage induced on the corresponding portions of said rotor conductive members which face the another one of said stators;

whereby a rotation speed of said rotor can be varied by the controlling of said phase shifting means.

According to the present invention, there is also provided a variable speed controllable induction motor comprising:

a single rotor formed in one-piece having a plurality of rotor cores axially mounted on a common axis with an airspace or a non-magnetic core portion being provided between said rotor cores and having, on said rotor cores, a plurality of sets of rotor conductive members including first group conductive members effective specifically for a low speed range and second group conductive members effective specifically for a high speed range, at least either of said first group conductive members and said second group conductive members being skewed at an angle different from that of the other of said first and second group conductive members at said airspace or said non-magnetic core portion;

a plurality of stators disposed side by side and surrounding and facing said respective rotor cores; and phase shifting means for producing phase differences between the voltage induced on the portions of said rotor conductive members which face one of said plurality of stators and the voltage induced on the corresponding portions of said rotor conductive members which face the another one of said stators;

whereby a rotation speed of said rotor can be varied by the controlling of said phase shifting means.

BRIEF DESCRIPTION OF THE DRAWINGS

Further details and features of this invention will be set forth in the following specification, claims and drawings in which:

DESCRIPTION OF THE PREFERRED EMBODIMENTS

The embodiments of the present invention are explained hereunder with reference to the appended drawings. Although the explanation is made with reference to a three-phase induction motor which can be considered a typical type of multi-phase induction motor, it is to be understood that the present invention can well be embodied in other multi-phase induction motors. As to the types of the rotor, they are not limited to an ordinary squirrel-cage type or a double squirrel-cage type which are used for explanation in this specification since other types, such a deep-slot squirrel-cage type, a special squirrel-cage type, can be adopted for the motor of the present invention. When referred to as "conductive members" in this specification, it is meant for squirrel-cage type conductive members disposed in a slot of a squirrel-cage type rotor.

A first embodiment according to the present invention is hereinafter explained by making reference to FIGS. 1 to 5.

Figure 1:
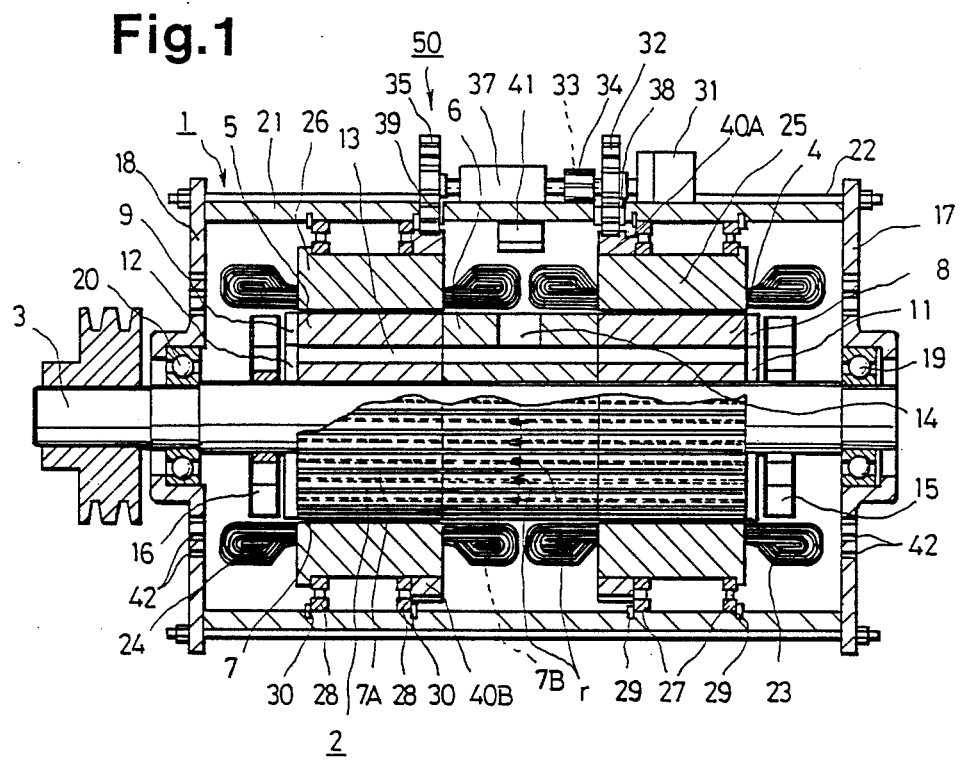
FIG. 1 is a side elevational view, a portion in the direction of the rotary shaft being in broken section, of the induction motor according to the present invention.
Figure 2:
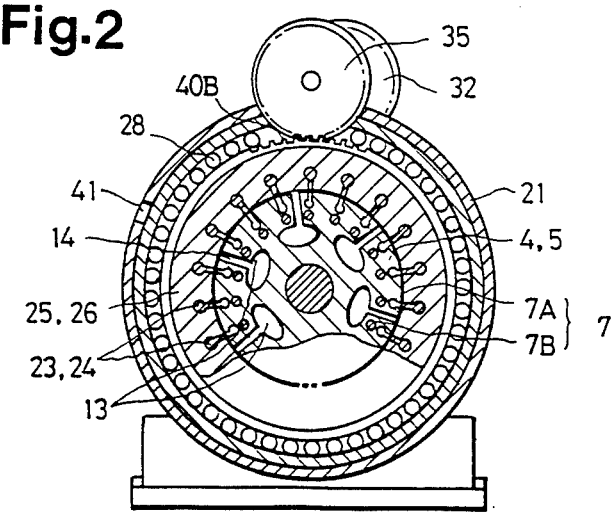
FIG. 2 is a transverse sectional view of the motor of FIG. 1.
Figure 3:
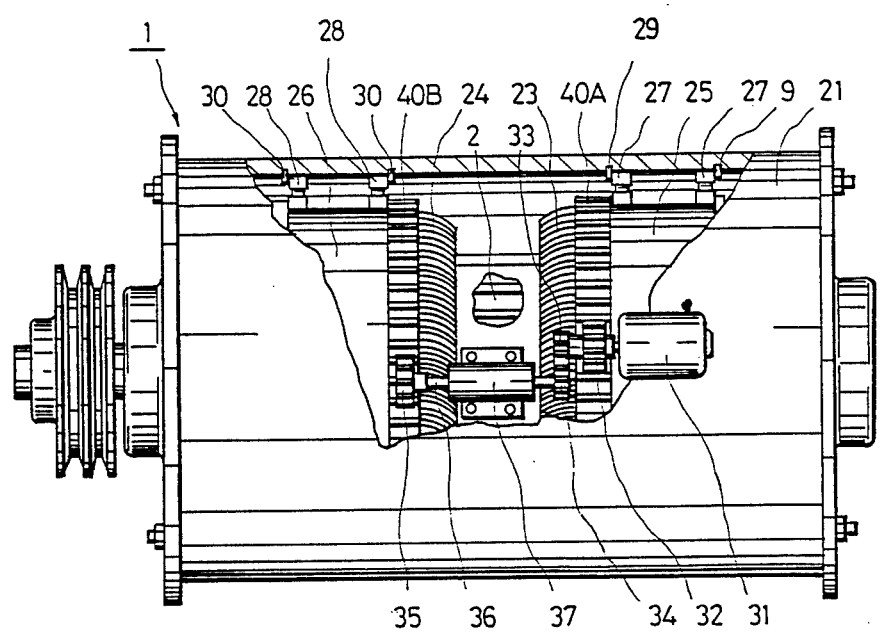
FIG. 3 is a top view, partly in broken section, of the rotating means for the stators of the motor of FIG. 1.
Figure 4:
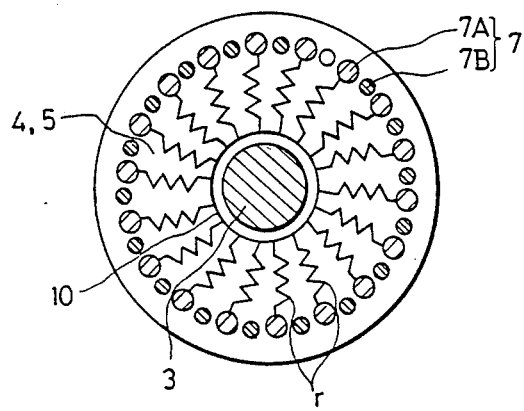
FIG. 4 is a schematic illustration of an arrangement wherein all of the rotor conductive members are disposed on the circumferences of the same diameter from the axis of rotation.

The squirrel-cage rotor type induction motor 1 according to the present invention has an arrangement as outlined hereinafter. A rotary shaft 3 of a rotor 2 carries thereon ferromagnetic rotor cores 4 and 5 disposed with a predetermined space therebetween. A nonmagnetic core 6 is interposed between the rotor cores 4 and 5. However, in a smaller type induction motor, such a core is sometimes dispensed with and an airspace serves the purpose. In a number of slots extending axially on the same diameter circumferences (refer FIG. 4) or different diameter circumferences (refer FIG. 2) of the rotor cores 4 and 5, there are provided first group conductive members 7A . . . and second group conductive members 7B . . . which extend through ends of the cores 4 and 5 and the rotor 2 is formed in one-piece by an arrangement wherein the first group conductive members 7A . . . and the second group conductive members 7B . . . are short-circuited respectively at the ends through short-circuit end rings 8 and 9. The first group conductive members 7A . . . are of higher resistivity materials, for example, aluminum and are provided on the rotor cores 4 and 5 in a manner that a reactance component thereof may become smaller. On the other hand, the second group conductive members 7B . . . are of lower resistivity materials, for example, copper and are provided on the rotor cores 4 and 5 in a manner that a reactance component thereof may become larger. However, if the same material were to be used for the first group conductive members 7A . . . and the second group conductive members 7B . . ., the necessary difference in resistivity could be achieved by a change in the respective dimensions in cross sectional areas thereof. The first group conductive members 7A . . . and the second group conductive members 7B . . . make up a squirrel-cage of conductive members, that is, conductive members 7 of the rotor 2. The first group conductive members 7A . . . are short-circuited, at the airspace portion or the non-magnetic core portion 6 between the rotor cores 4 and 5 as shown in FIG. 4, by resisting members r . . . and a short-circuiting ring 10 through which the vector difference current flows. The resisting members r . . . may be such high resistive materials as nichrome wires, carbon-mixed steel, conductive ceramics. All of the first group conductive members 7A . . . do not have to be necessarily connected to the resisting members r . . . (unlike as shown in FIG. 4) as, for example, every second of the conductive members may well be connected to the resisting member r. In the case of FIG. 4, unlike the first group conductive members 7A . . ., the second group conductive members 7B . . . are not short-circuited with one another by the resisting members r . . . and the short-circuiting ring 10 at the airspace portion or the non-magnetic core portion 6 between the rotor cores 4 and 5 but they only communicate through between the outer end portions of the two rotor cores 4 and 5 and these end portions are short-circuited with each other by the short-circuit end rings 8 and 9. However, the second group conductive members 7B . . . may well be also short-circuited similarly as the first group conductive members 7A . . . by the resisting members and the short-circuiting ring.

Figure 5:
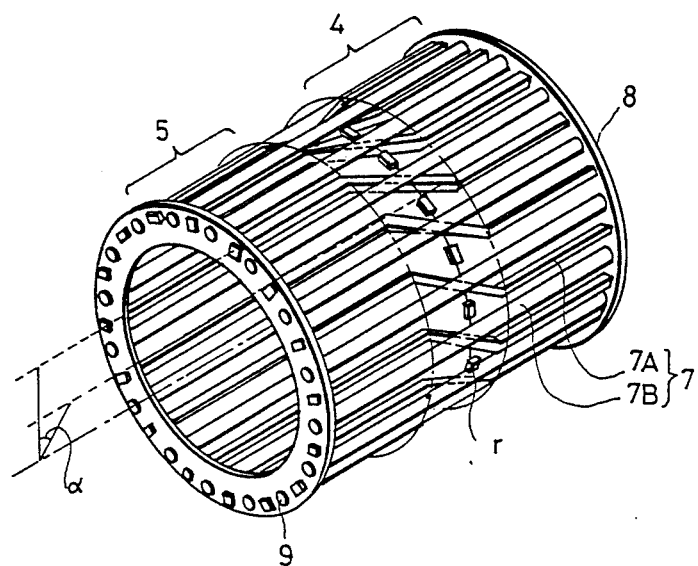
FIG. 5 is a structural illustration of the rotor conductive members in which the first group conductive members are disposed in a predetermined skewed angle with respect to the second group conductive members.

FIG. 5 schematically shows another embodiment of the squirrel-cage type conductive members 7 for use in the squirrel-cage induction motor 1 of the present invention. While the first group conductive members 7A . . . and the second group conductive members 7B . . . are both disposed parallely and linearly with respect to the rotary axis through the two rotor cores 4 and 5, the first group conductive members 7A . . . shown in FIG. 5 are differently arranged in that they are skewed, when viewed from the center of the rotary axis, in a predetermined angle $\alpha$ with respect to the second group conductive members 7B . . . at the airspace portion or non-magnetic core portion 6 between the rotor cores 4 and 5. In the case of the example shown in FIG. 5, the first group conductive members 7A . . . are skewed with respect to the second group conductive members 7B . . ., they can be arranged the other way around since the requirement is that either group conductive members are skewed with respect to the other group conductive members.

The rotor cores 4, 5 and the non-magnetic core 6 are provided with cavities 13 extending through the two end portions 11 and 12 of the rotor 2, and the non-magnetic core portion 6 is provided with a plurality of holes 14 radially extending towards the outer peripheral portion of the rotor 2 from the cavities 13. The two end portions 11, 12 of the rotor 2 carry cooling fans 15, 16 which force in air into the cavities 13 or exhaust the air from the cavities 13 as the rotor 2 rotates.

The unitary rotor 2 arranged as explained above is rotatably carried by bearing bases 17, 18 having thereon bearings 19, 20 so that it can rotate within a machine frame 21. To the two ends of the cylindrical machine frame 21 the bearing bases 17 and 18 are fastened by nuts on a connecting bar 22. The frame 21 has an appropriate number of exhaust holes, and the bearing bases 17 and 18 have a plurality of ventilating holes 42.

A first stator 25 wound with stator windings 23 and a second stator 26 wound with stator windings 24 surround and face the peripheral surfaces of the respective rotor cores 4 and 5 and they are disposed side by side within an inner wall of the machine frame 21. Slip bearings 27 and 28 are provided respectively between the frame 21 and the first stator 25 and between the frame 21 and the second stator 22 and the movement to right and left of these slip bearings is restricted by the stop rings 29 and 30 inserted in the inner walls of the machine frame 21.

On the top of the outer periphery of the machine frame 21 is mounted a pulse motor 31. A first driving gear 32 and an intermediate gear 33 are fixed to the driving shaft of the pulse motor 31. On the outer surface of the frame 21 is also provided with a bearing base 37 for rotatably carrying an intermediate shaft 36. This intermediate shaft 36 has at its end portions a second driving gear 35 and an intermediate gear 34 which meshes with the intermediate gear 33. The first driving gear 32 and the second driving gear 35 extend into the frame 21 through opening portions 38 and 39 provided in the machine frame 21 and engage with a gear 40A and a gear 40B provided on each of side peripheral surfaces of the first stator 25 and the second stator 26. The first stator 25 and the second stator 26 rotate co-axially and in a direction opposite to each other through the operation of a rotating means the main element of which consists of the pulse motor 31. A relative rotational difference due to the rotation of the first stator 25 and the second stator 26 causes production of a phase difference between the rotating magnetic fields generated around the rotor cores 4 and 5. Thus, the rotating means of the first and second stators 25 and 26 provide mechanically a voltage phase shifting means. The controlling of the amount of rotation of the first and second stators 25 and 26, that is, the controlling of the phase difference between the generated rotating magnetic fields, is performed by the operation of the pulse motor 31. As to the source of driving power, this is not limited to the pulse motor 31 as other sources, such as a pneumatic or hydraulic servo-mechanism can be used, or in a simplest form, even a manual operation by way of a handle can also be used. In the example as shown in the drawings, the first stator 25 and the second stator 26 rotate at the same time and in a direction opposite from each other but, in a simple arrangement, either one of the first stator 25 and the second stator 26 may be rotated. Further, where a very precise or fine control is required, an arrangement may be made wherein both the stators are caused to be rotated in the same direction but with different rotational speeds.

Figure 6A:
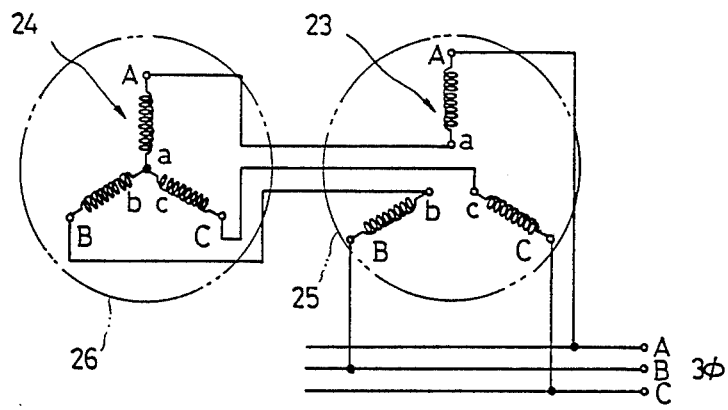
FIG. 6($a$) and FIG. 6($b$) are diagrams showing the connection of the stator windings to the power source.
Figure 6B:
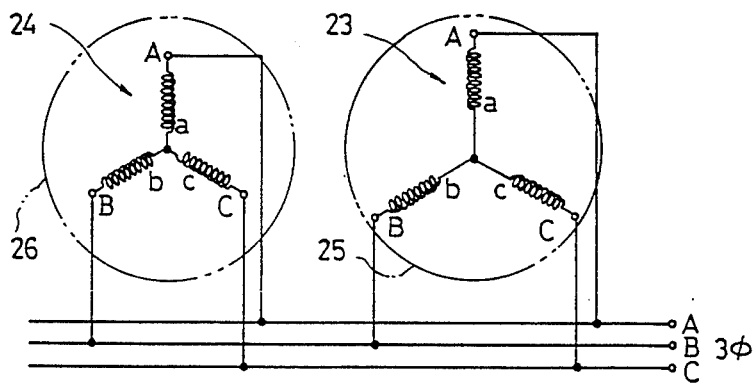

There are two methods of connecting the stator windings 23 and 24 wound respectively on the first and second stators 25 and 26 to the three-phase power source lines. One method is to connect the stator windings in series as shown in FIG. 6(a) and the other is to connect them simply in parallel as shown in FIG. 6(b). Only a Y-connection is shown but a delta-connection is also acceptable. When the stator windings of the motor are connected to the power source, the stators 25 and 26 generate rotating magnetic fields around the rotor 2 and the induced current flows in the rotor conductive members 7. The induced current flowing in the rotor conductive members and the rotating magnetic flux generate a rotating torque. The operational characteristics are different depending on whether the connection of the stator windings 23 and 24 to the three-phase power source is in series or parallel, which is explained hereunder.

Figure 7:
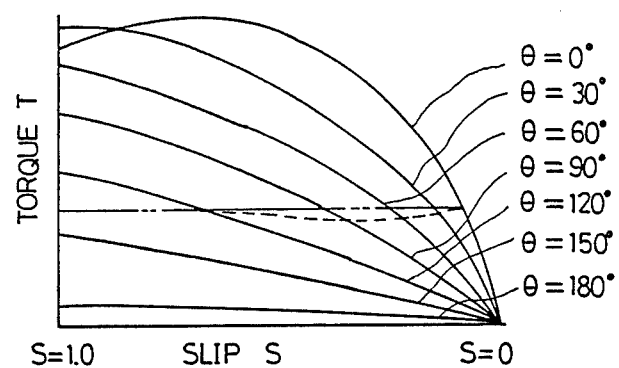
FIGS. 7 to 10 show typical speed-torque curves of the variable speed controllable induction motor of the present invention when the stator windings are connected in series to the power source.
Figure 8:
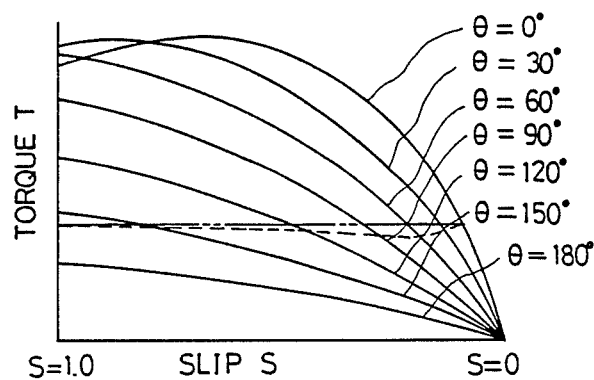
Figure 9:
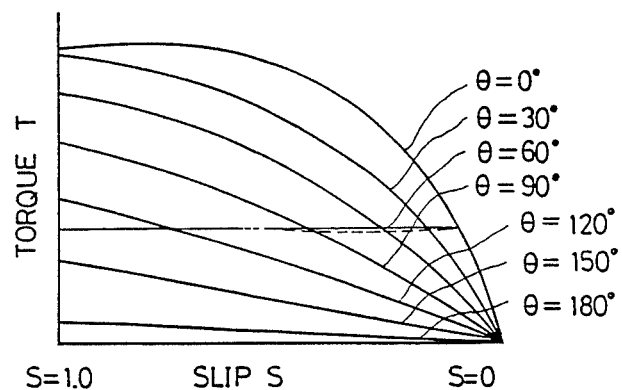
Figure 10:
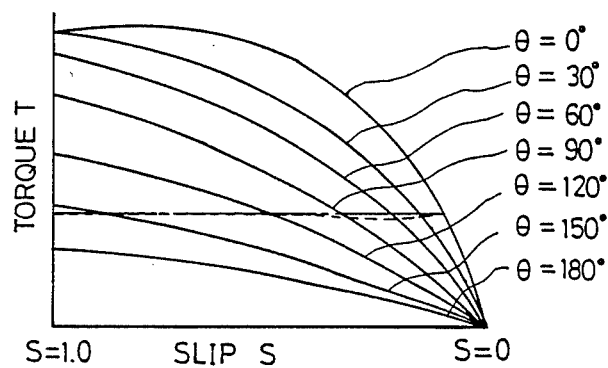

FIG. 6(a) shows an example wherein the connection of the stator windings 23, 24 to the power source lines is in series. The first and second group conductive members effectively function respectively for different speed ranges, that is, the first group conductive members 7A . . . for the range of high-slip where the rotational speed is low and the second group conductive members 7B . . . for the range of low-slip where the rotational speed is high. The general torque-speed characteristics obtained when the rotor conductive members 7 are not skewed at the airspace or non-magnetic core portion 6 are as generally shown in FIG. 7 or FIG. 8, and the same when the conductive members 7 are skewed are as graphically shown in FIG. 9 or FIG. 10. In the graphs, the dotted lines represent the relationship between the torque and the slip when the values of the current are the same.

Figure 11:
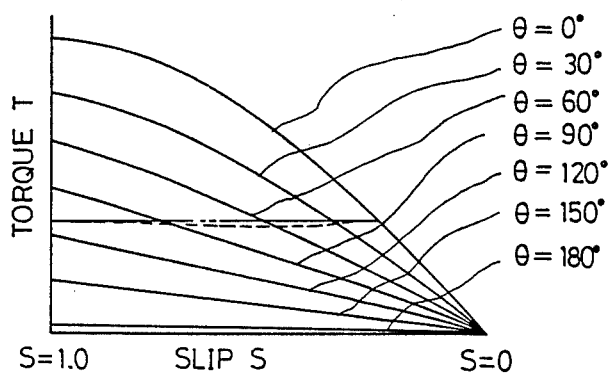
FIG. 11 shows relevant speed-torque curves of the motor when the rotor conductive members consist only of the first group conductive members, the conductive members are short-circuited by the resisting members and the stator windings are connected to the power source in series.
Figure 12:
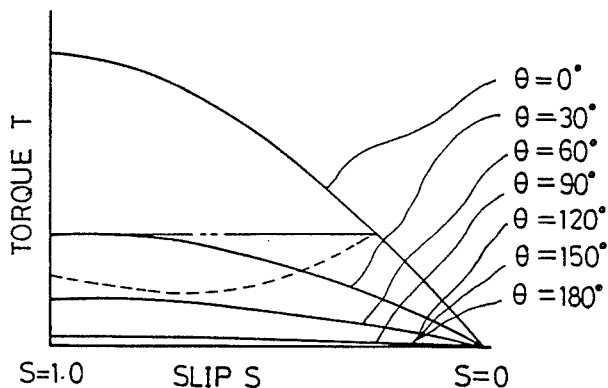
FIG. 12 shows speed-torque curves of the motor when the rotor conductive members consist only of the first group conductive members, the conductive members are not short-circuited by the resisting members and the stator windings are connected to the power source in series.

Let us assume that all of the rotor conductive members 7 of the rotor 2 are of comparatively high resistivity material and are short-circuited at the airspace or non-magnetic core portion 6 thereof but that they consist only of the first group conductive members 7A . . . which are not skewed. Here, when the relative rotation between the first and the second stators 25 and 26 is zero and there is no phase difference, that is, $\theta=0°$ in the rotating magnetic fields between the two stators 25 and 26, no current flows in the resisting members r which are connected to the conductive members 7. Thus, the resisting members r do not affect the characteristics and, except for a small increase in the slip at the rating load due to a comparatively high resistivity in the first group conductive members 7A . . ., the torque characteristics of this motor are not different from those of normal ones. However, when the first stator 25 and the second stator 26 are rotated respectively in a reverse direction by the operation of the pulse motor 31 thereby producing a phase difference $\theta$ between the two rotating magnetic fields generated by the two stators 25, 26, the current of a vector difference due to the phase difference $\theta$ flows in the resisting materials r connected to the conductive members 7. Since the stator windings 23 and 24 are interconnected in series, the amounts of current which flow respectively in the windings 23 and 24 are the same even if there should be differences in the resistance values of the respective windings 23 and 24 and in the capacities of the stators 25 and 26. Thus, the absolute values of the current which flows due to the voltage induced at the respective portions of the conductive members 7 corresponding to the first stator 25 and the second stator 26 become the same. Also, as the current of a vector difference due to the difference of the rotating magnetic fields generated by the two stators 25 and 26 flows in the resisting members r connected to the conductive members 7, when the rotor conductive members 7 consist only of the first group conductive members 7A . . . which are short-circuited by the resisting members r, the speed-torque characteristics of the motor show that the torque is greater at the side of high-slip region where the speed is low and becomes wide in speed controllable ranges as shown in the graphs of FIG. 11. As reference, FIG. 12 shows an example wherein all of the conductive members 7 of the rotor 2 are made of comparatively high resistive materials but are not short-circuited by the resisting members r. It can be readily understood from FIG. 12 that the maximum torque greatly drops as the phase difference $\theta$ increases, that the speed control is difficult and that the range in which the speed could be controlled is narrow.

Figure 13:
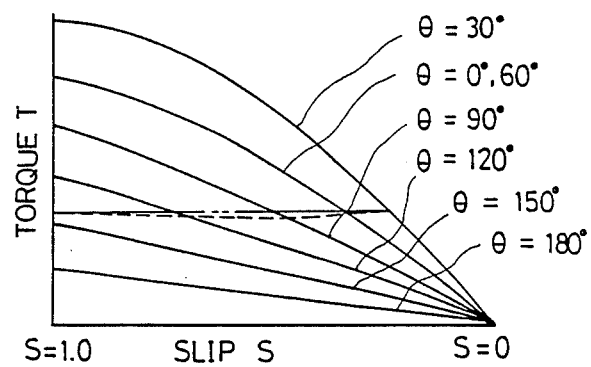
FIG. 13 shows, speed-torque curves of the motor when the rotor conductive members consist only of the second group conductive members, the conductive members are short-circuited and skewed and the stator windings are connected to the power source in series.

Next, assuming that all of the rotor conductive members 7 are made of higher resistivity materials and consist of only the first group conductive members 7A . . . which are short-circuited by the resisting members r and skewed by an angle $\alpha$ at the airspace portion or the non-magnetic core portion 6, the speed-torque characteristics then will be explained hereinafter. Even when the amount of the relative rotation between the first and the second stators 25 and 26 is zero and there is no phase difference ($\theta=0°$) between the two rotating magnetic fields generated by the respective stators 25 and 26, there in substance exist rotating magnetic fields of different phases due to a skewed angle $\alpha$ at the rotor conductive member portions corresponding to the respective stators 25 and 26 and induced voltages of different phases are generated at each of the different conductive member portions, thereby causing the vector difference current due to the above phase difference to flow through the resisting members r connected to the conductive members 7. Where the number of poles of the motor is four, the skew angle α, which is a mechanically provided angle, corresponds to 2α when converted into an electrical phase angle difference θ between the two rotating magnetic fields. Accordingly, even when the skew angle α is 15 degrees (α=15°) and the relative rotation amount between the first and second stators 25 and 26 is zero (θ=0°), the voltages of different phases corresponding to the phase difference θ=30°. are induced in the rotor conductive members 7 so that the vector difference current caused thereby flows through the resisting members r. That is, the speed-torque characteristic curve at the phase difference θ=0° substantially equals to the curve at θ=30° in FIG. 11. Next, when the amount of relative rotation between the first and second stators 25 and 26, that is, the phase difference θ, is progressively increased until the phase angle becomes θ=30° which is twice the skew angle (α=15°), the substantive phase difference between the rotor conductive members 7 and the first and second stators 25 and 26 gradually decreases eventually down to zero so that no vector difference current flows any longer through the resisting members r. That is, the speed-torque characteristic curve when the phase difference becomes 30 degrees (θ=30°) substantially equals to the speed-torque characteristic curve represented at θ=0° in FIG. 11. When the amount of rotation between the first and second stators 25 and 26, that is, the phase difference θ existing between the rotating magnetic fields is increased over θ=30 degrees, the substantive phase difference between the rotor conductive members 7 and the first and second stators 25 and 26 changes to increase from zero degree and the speed-torque characteristic curves at various points substantially equal to the speed-torque characteristic curves at θ=30°, 60°, 90° ... as shown in FIG. 11. Therefore, when all of the rotor conductive members 7 of the rotor 2 are made of higher resistivity materials and consist of only the first group conductive members 7A ... which are shortcircuited and also skewed by angle α at the airspace or non-magnetic core portion 6, the speed-torque characteristics obtained are as shown in FIG. 13. These characteristics are, as with the graphs in FIG. 11, such that, at the high-slip region where the rotational speed is low, the speed controllable range is wide and it is possible to obtain a greater torque.

Figure 14:
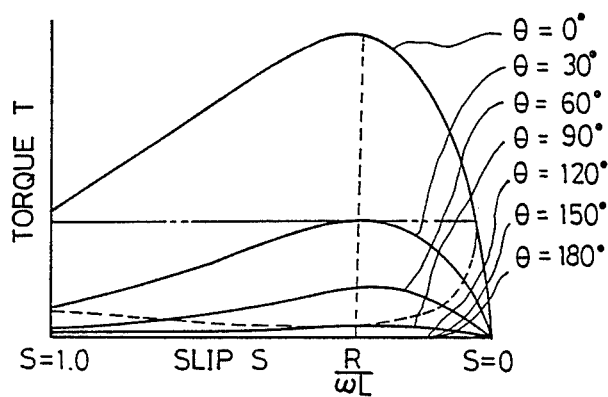
FIG. 14 shows speed-torque curves of the motor when the rotor conductive members consist only of the second group conductive members, the conductive members are not short-circuited and the stator windings are connected to the power source in series.

On the contrary, when all of the rotor conductive members 7 of the rotor 2 consist only of the second group conductive members 7B ... which are made of lower resistivity materials, the speed-torque characteristics of the motor are as explained hereunder. In one arrangement, the rotor conductive members 7 are short-circuited and in another they are not. In either case, when the amount of the relative rotation between the first and second stators 25 and 26 is zero and the phase difference θ between the rotating magnetic fields generated by the respective stators 25 and 26 is zero (θ=0°), the torque becomes the maximum. The maximum torque appears when the slip S is S=R/ωL wherein the resistance and the inductance of the conductive members 7 are R and L and the angular frequency of the power source is ω. However, when the conductive members 7 are not short-circuited by the resisting members r, an increase of the phase difference θ between the rotating magnetic fields generated by the two stators 25 and 26 causes the current inversely proportional to such phase difference to flow through the conductive members 7 so that the driving torque rapidly decreases as the phase difference θ increases. In this case, since the conductive members 7 are of comparatively low resistivity materials, the slip under the rating load is smaller than that when the conductive members 7 are those of the first group conductive members 7A ... which are of higher resistivity materials, and thus, the speedtorque characteristics of the motor are as shown in FIG. 14 from which it is noted that the effective torque is produced at low speed range where the slip value is high. On the other hand, as explained above, when the conductive members 7 are short-circuited by the resisting members r, the vector difference current corresponding to a difference in the amount of rotation of the first and second stators 25 and 26, that is, corresponding to the phase difference θ between the rotating magnetic fields generated by the two stators 25 and 26 flows through the resisting members r so that, although the maximum value of the torque slightly decreases as the phase difference θ increases, the effective torque is produced in a wide range from a high speed range to some low speed range as noted from the graphs in FIG. 15.

Figure 15:
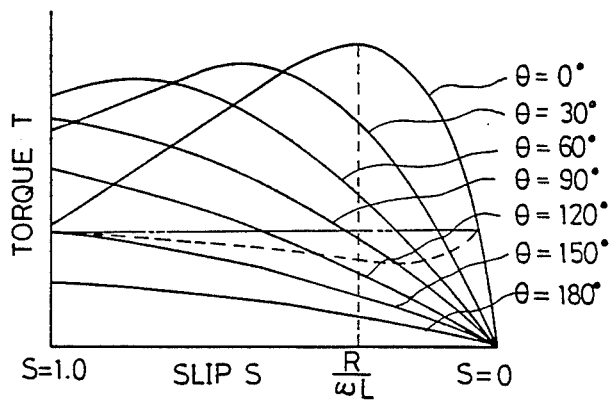
FIG. 15 shows speed-torque curves of the motor when the rotor conductive members consist only of the second group conductive members, the conductive members are short-circuited and the stator windings are connected to the power source in series.

The rotor 2 of the induction motor of the present invention comprises, as explained hereinabove, the rotor conductive members 7 having both the first group conductive members 7A ... which produce effective torque at the high-slip region (low speed range) and the second group conductive members 7B ... which produce effective torque at the low-slip region (high speed range). The characteristics of the motor represent (as shown in graphs in FIG. 7 as the overall effects obtained at each phase difference) the combination of the characteristics as shown in FIG. 11 which are obtained from the effective functioning of the first group conductive members 7A ... and the characteristics as shown in FIG. 14 which are obtained from the effective functioning of the second group conductive members 7B ... or represent (as shown in graphs in FIG. 8 as the overall effects obtained at each phase difference) the combination of the characteristics as shown in FIG. 11 and the characteristics as shown in FIG. 15 which are obtained from the effective functioning of the second group conductive members 7B ..... Further, when the arrangement is such that the first group conductive members 7A ... are skewed between the rotor cores 4 and 5, the characteristics represent (as shown in graphs in FIG. 9 as the overall effects obtained at each phase difference) the combination of the characteristics as shown in FIG. 13 which are obtained from the effective functioning of the first group conductive members 7A ... and the characteristics as shown in FIG. 14 which are obtained from the effective functioning of the second group conductive members 7B ... or represent (as shown in graphs in FIG. 10 for overall effects obtained at each phase difference) the combination of the characteristics as shown in FIG. 13 and the characteristics as shown in FIG. 15 which are obtained from the effective functioning of the second group conductive members 7B ..... As shown in dotted lines in FIGS. 7 and 8 and also FIGS. 9 and 10, it is possible not only to obtain a constant and stable torque in a wide range from the low speed range to the high speed range at the same current value but also a higher torque not only at starting of the motor but also through a wide range from the low speed range to the high speed range by means of controlling the relative amount of rotation between the first and second stators 25 and 26, that is, the phase difference θ produced between the rotating magnetic fields generated by the respective stators.

Figure 16:
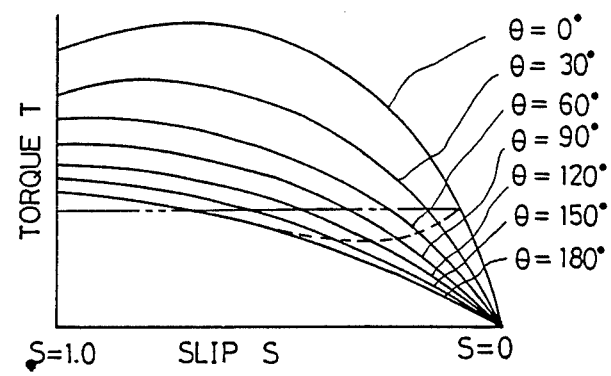
FIGS. 16 to 19 show typical speed-torque curves of the motor according to the present invention when the stator windings are connected to the power source in parallel.
Figure 17:
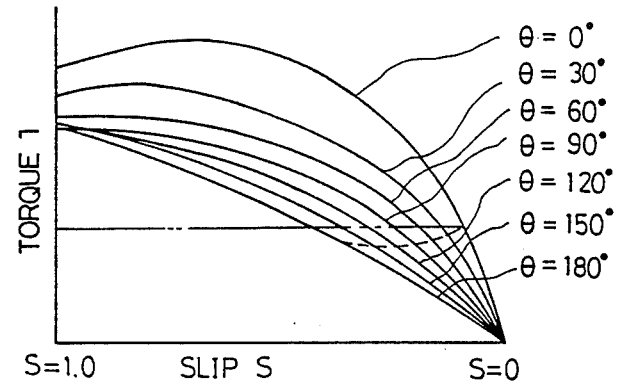
Figure 18:
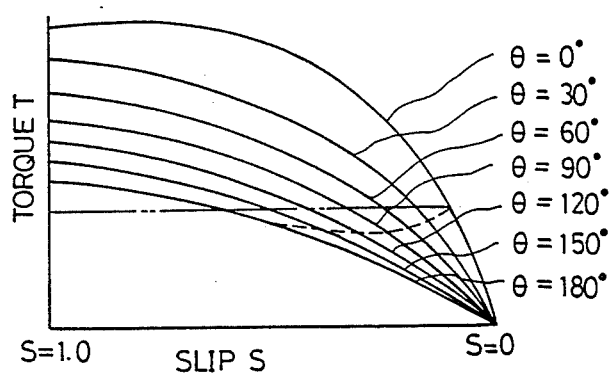
Figure 19:
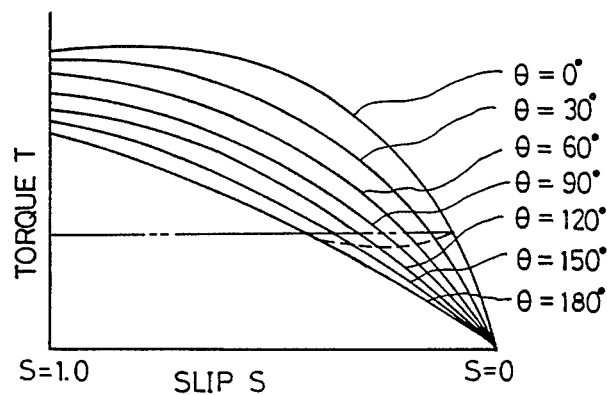

Next, explanation is made with reference to FIG. 6(b) wherein the stator windings 23 and 24 are connected in parallel to the power source lines. In this case, the first group conductive members 7A ... and the second group conductive members 7B ... function effectively in different speed ranges, that is, generally the first group 7A ... are effective in the high-slip range and the second group 7B ... are effective in the low-slip range. The combined speed-torque characteristic curves thus obtained in the case where the rotor conductive members 7 are not skewed at the airspace portion or non-magnetic core portion 6 are shown in FIG. 16 or FIG. 17, and those where the conductive members 7 are skewed are shown in FIG. 18 or FIG. 19.

Figure 20:
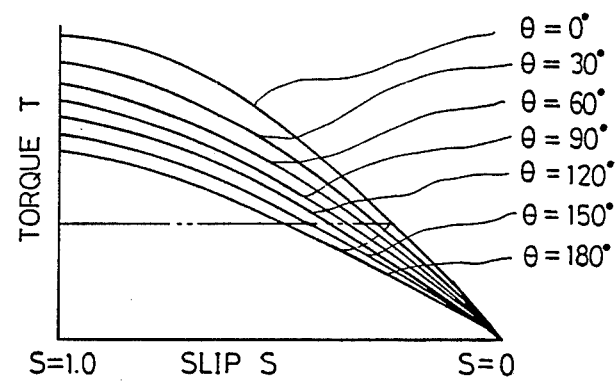
FIG. 20 shows speed-torque curves of the motor when the rotor conductive members consist only of the first group conductive members, the conductive members are short-circuited by the resisting members and the stator windings are connected to the power source in parallel.
Figure 21:
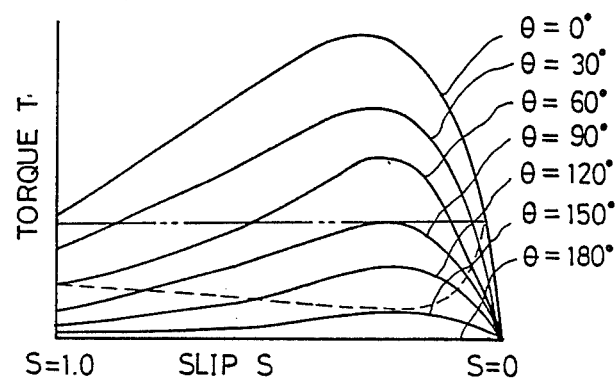
FIG. 21 shows speed-torque curves of the motor when the rotor conductive members consist only of the second group conductive members, the conductive members are not short-circuited by the resisting members and the stator windings are connected to the power source in parallel.
Figure 22:
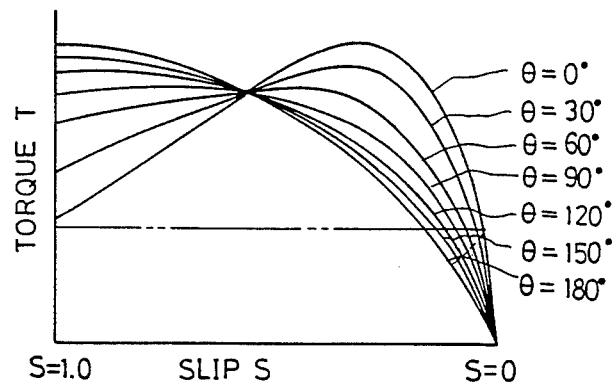
FIG. 22 shows speed-torque curves of the motor when the rotor conductive members consist only of the second group conductive members, the conductive members are short-circuited by the resisting members and the stator windings are connected to the power source in parallel.

If all of the rotor conductive members 7 of the rotor 2 consist of only the first group conductive members 7A ... which are of higher resistivity materials and are short-circuited by the resisting members r but not skewed at the non-magnetic core portion 6, the speed-torque characteristic curves of the motor will be as shown in graphs in FIG. 20 from which it is noted that a greater torque is produced at the high-slip region where the rotational speed is low. On the contrary, if all of the rotor conductive members 7 of the rotor 2 consist of only the second group conductive members 7B ... and are not skewed at the non-magnetic core portion 6, the speedtorque characteristic curves will be as shown in FIG. 21 when the resisting members r are present and, as shown in FIG. 22 when the resisting members r are not present. Either set of the speed-torque characteristic curves shows that although the speed controllable range is narrow the effective torque is produced at the low-slip region. All of the speed-torque characteristic curves represented in FIGS. 20, 21 and 22 show that, although they cannot be regarded, when taken individually, as satisfactory in terms of the production of torque or of the speed variation range, it will be possible to obtain the improved speed-torque characteristics both in the torque output and the variable speed range as shown in FIGS. 16 and 17 if the speed-torque characteristic curves of FIG. 20 residing in a high torque at the high-slip region are combined with the speed-torque characteristic curves of FIG. 21 or 22 residing in an effective and high torque at the low-slip region. FIGS. 18 and 19 relate to the motor which is arranged so as to produce the characteristic curves of FIGS. 16 and 17 and show the speed-torque characteristics obtained when either of the first group conductive members 7A ... and the second group conductive members 7B ... are skewed with respect to the other group conductive members.

With the speed-torque characteristic curves obtained when the stator windings are connected in parallel to the power source lines, unlike in the case of a series connection as explained before, it is difficult to achieve a speed variation in a wide range when the load is high. However, such arrangement may be capable of varying a speed in a wide range if the load is such that it becomes lighter as the rotational speed increases (declining load characteristics).

In the above example, a voltage phase shifting means 50 which is a mechanical means for effecting a relative rotation between the first and second stators 25 and 26 has been illustrated and explained as a means which induces voltages of different phases for respective portions of the rotor conductive members surrounded by the first and second stators 25 and 26. However, this voltage phase shifting means may well be substituted by electrically arranged means wherein stepwise phase differences between the two stators may be provided by the switching of the inter-connections of stator windings with respect to the power source, by means wherein stepwise phase differences may be provided by the switching of the stator windings between the delta-connection and the Y-connection, or by means wherein an induction type phase shifting apparatus is placed between the windings of the first and second stator and phase differences are continuously produced. Also, depending on the load or speed variation conditions concerned, the use of the motor, etc., the mechanical means as illustrated may be used in combination with the electrical means for phase shifting.

The induction motor of the present invention may be used as an induction generator or a brake means without the need of changing the basic construction thereof. When used as the induction generator, the rotor shaft may be directly connected to the shaft of a prime mover such as a turbine and electricity may be generated by having the phase difference regulated appropriately by the phase shifting, in which case an expensive speed adjusting apparatus or a pitch changing apparatus can be dispensed with and yet it is possible to have electricity generated stably. Where a combustion engine as a prime mover is connected and when the phase difference is regulated by the phase shifting means, it is possible to generate electricity in accordance with the number of rotations at which the energy consumption is at a minimum. Where the energy source is wind or water, the prime power is weak and unstable but it is possible to generate electricity at a rotational speed at which the maximum output can be drawn out.

Where the induction motor of the present invention is used as a brake means, the rotary shaft may be connected to another rotary shaft and a phase-changing switch may be provided for changing the two phases of the stator windings at the input side. By the operation of the phase-changing switch and the phase shifting means, braking action to the rotary shaft connected can be effectively and efficiently performed.

While the invention has been described in its preferred embodiments, it is to be understood that the words which have been used are words of description rather than limitation and that the changes within the purview of the appended claims may be made without departing from the true scope and spirits of the invention in its broader aspects.

What is claimed is:

1. A variable speed controllable induction motor comprising:

a single rotor formed in one-piece having a plurality of rotor cores axially mounted on a common axis with a non-magnetic portion being provided between said rotor cores and having, on said rotor cores, a plurality of sets of rotor conductive members including first group conductive members effective specifically for a low speed range and a second group conductive members effective specifically for a high speed range, at least said first group conductive members being short-circuited at said non-magnetic portion by resisting members and each set of said rotor conductive members being respectively connected linearly;

a plurality of stators disposed side by side and surrounding and facing said respective rotor cores; and phase shifting means for producing phase differences between the voltage induced on the portions of said rotor conductive members which face one of said plurality of stators and the voltage induced on the corresponding portions of said rotor conductive members which face the another one of said stators;

whereby a rotation speed of said rotor can be varied by the controlling of said phase shifting means.

2. A variable speed controllable induction motor according to claim 1, wherein said first group conductive members and said second group conductive members are provided respectively on the circumferences the diameters of which are different from each other.

3. A variable speed controllable induction motor according to claim 1, wherein said first group conductive members are of higher resistivity and said second group of conductive members are of lower resistivity.

4. A variable speed controllable induction motor according to claim 1, wherein said non-magnetic portion comprises a non-magnetic core portion.

5. A variable speed controllable induction motor according to claim 1, wherein said non-magnetic portion comprises an airspace.

6. A variable speed controllable induction motor comprising:

a single rotor formed in one-piece having a plurality of rotor cores axially mounted on a common axis with non-magnetic portion being provided between said rotor cores and having, on said rotor cores, a plurality of sets of rotor conductive members including first group conductive members effective specifically for a low speed range and second group conductive members effective specifically for a high speed range, at least either of said first group conductive members and said second group conductive members being skewed at an angle different from that of the other of said first and second group conductive members at said non-magnetic portion;

a plurality of stators disposed side by side and surrounding and facing said respective rotor cores; and phase shifting means for producing phase differences between the voltage induced on the portions of said rotor conductive members which face one of said plurality of stators and the voltage induced on the corresponding portions of said rotor conductive members which face the another one of said stators;

whereby a rotation speed of said rotor can be varied by the controlling of said phase shifting means.

7. A variable speed controllable induction motor according to claim 6, wherein said first group conductive members and said second group conductive members are provided respectively on circumferences the diameters of which are different from each other.

8. A variable speed controllable induction motor according to claim 6, wherein said first group conductive members are of higher resistivity and said second group conductive members are of lower resistivity.

9. A variable speed controllable induction motor according to claim 6, wherein at least said first group conductive members are short-circuited by resisting members at said non-magnetic portion.

10. A variable speed controllable induction motor according to claim 6, wherein said non-magnetic portion comprises a non-magnetic core portion.

11. A variable speed controllable induction motor according to claim 6, wherein said non-magnetic portion comprises an airspace.

* * * * *

UNITED STATES PATENT AND TRADEMARK OFFICE
CERTIFICATE OF CORRECTION

PATENT NO. : 4,945,296

DATED : July 31, 1990

INVENTOR(S) : Toshihiko SATAKE

It is certified that error appears in the above-identified patent and that said Letters Patent is hereby corrected as shown below:

IN THE SPECIFICATION

Column 4, line 27, delete "," after "shows".

Column 9, line 9, delete "." after "30°".

Column 10, line 6, change "speedtorque" to --speed-torque--.

Column 11, line 27, change "speedtorque" to --speed-torque--.

Signed and Sealed this

Seventh Day of January, 1992

Attest:

HARRY F. MANBECK, JR.

*Attesting Officer*    *Commissioner of Patents and Trademarks*